(12) United States Patent
Uruma

(10) Patent No.: US 9,836,344 B2
(45) Date of Patent: Dec. 5, 2017

(54) INFORMATION PROCESSING APPARATUS, CONTROL METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Shuichi Uruma, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 14/818,174

(22) Filed: Aug. 4, 2015

(65) Prior Publication Data

US 2016/0041865 A1    Feb. 11, 2016

(30) Foreign Application Priority Data

Aug. 8, 2014 (JP) .................................. 2014-162625

(51) Int. Cl.
*G06F 11/34* (2006.01)
*G06F 11/07* (2006.01)

(52) U.S. Cl.
CPC ...... *G06F 11/0787* (2013.01); *G06F 11/0733* (2013.01); *G06F 11/0751* (2013.01); *G06F 11/0775* (2013.01)

(58) Field of Classification Search
CPC ............. G06F 11/0766; G06F 11/0787; G06F 11/3476
USPC .......................................................... 714/45
See application file for complete search history.

(56) References Cited

U.S. PATENT DOCUMENTS

| 8,069,147 B2 * | 11/2011 | Blazejewski | G06F 17/30569 707/640 |
| 2002/0035697 A1* | 3/2002 | McCurdy | G06F 17/30011 726/3 |
| 2005/0033553 A1* | 2/2005 | Swaine | G06F 11/3636 702/176 |
| 2006/0149788 A1* | 7/2006 | Bosloy | G06Q 10/06 |
| 2006/0161593 A1* | 7/2006 | Mori | G06F 19/3412 |
| 2008/0077752 A1* | 3/2008 | Kinoshita | G06F 11/0727 711/154 |
| 2009/0222492 A1* | 9/2009 | Yamauchi | G06F 11/3476 |
| 2010/0031094 A1* | 2/2010 | Komagome | G11B 20/18 714/48 |
| 2011/0202802 A1* | 8/2011 | Gotoh | G06F 11/079 714/45 |
| 2012/0117037 A1* | 5/2012 | Suzuki | G06F 17/30368 707/692 |
| 2013/0074051 A1* | 3/2013 | Freeman | G06F 11/3466 717/130 |

(Continued)

FOREIGN PATENT DOCUMENTS

JP          5334739 B2    11/2013

*Primary Examiner* — Chae Ko
(74) *Attorney, Agent, or Firm* — Canon U.S.A., Inc. IP Division

(57) ABSTRACT

An information processing apparatus configured to record logs includes a log collection unit that collects logs recorded according to executed functions and store an audit log file including the collected logs, a detection unit that detects an error in the collection of logs recorded according to the executed functions, and a control unit that, when the error is detected, compresses the stored audit log file and separately stores the compressed log file while continuing to collect logs.

14 Claims, 8 Drawing Sheets

(56) References Cited

U.S. PATENT DOCUMENTS

| | | | |
|---|---|---|---|
| 2013/0139179 A1* | 5/2013 | Roll | G06F 11/0709 719/318 |
| 2013/0227358 A1* | 8/2013 | Yokokura | G06F 11/0733 714/57 |
| 2014/0089741 A1* | 3/2014 | Kadowaki | G06F 11/3636 714/45 |
| 2014/0160514 A1* | 6/2014 | Matsuyama | G06F 3/1229 358/1.14 |
| 2014/0280197 A1* | 9/2014 | Gatto | G06F 17/30424 707/741 |
| 2015/0121136 A1* | 4/2015 | Namkoong | G06F 11/0793 714/15 |
| 2015/0212904 A1* | 7/2015 | Scanlon | G06F 11/3476 714/19 |
| 2016/0055044 A1* | 2/2016 | Kawai | G06N 99/005 714/26 |
| 2016/0188897 A1* | 6/2016 | Zatko | G06F 21/6218 726/28 |

\* cited by examiner

INFORMATION PROCESSING APPARATUS, CONTROL METHOD FOR CONTROLLING INFORMATION PROCESSING APPARATUS, AND STORAGE MEDIUM

BACKGROUND

Field

Aspects of the present invention generally relate to a technique for controlling an information processing apparatus having a log recording function.

Description of the Related Art

A Multifunction peripheral (MFP), including an image reading apparatus, a printing apparatus, an image storing apparatus, and a communication apparatus, and provided with image processing applications used for copying, printing, scanning, and facsimile transmission and reception. Many MFPs further include information processing apparatus functions such as a document file storing function and a user authentication function.

Accordingly, similarly to other information apparatuses and devices, for the purpose of traceability, audit, prevention of information leakage g, etc., a function that records a log according to the operation of an MFP has been proposed. Such a log is called an "audit log".

When an information leak or an unauthorized access has been discovered, by referring to an audit log, tracing thereof can be performed by using the audit log. For this purpose, it is important, even if any error has occurred with a process for recording or storing the audit log, that association between the operation of the MFP and the audit log is always kept. In addition, it is necessary to preserve an audit log obtained when an error has occurred so as not to be lost, since the audit log is important in order to analyze a cause of the error. Japanese Patent No. 5334739 discusses a technique for satisfying such conditions.

Japanese Patent No. 5334739 discusses a method of dealing with a case where a network fault or the like has occurred in a configuration in which an audit log file is transmitted outside of an MFP. More specifically, in the technique discussed in Japanese Patent No. 5334739, when the file size of an audit log exceeds a predetermined threshold, the operation of the MFP is stopped. With this control, according to the technique discussed in Japanese Patent No. 5334739, a situation, in which "despite that the MFP has operated, an audit log corresponding to the operation fails to remain", does not occur.

Further, with this control, a situation, in which an audit log obtained at an error is lost due to overwriting with a newly recorded audit log, does not occur. As a result, the correspondence between the operation of the MFP and the audit log is always kept, and the audit log obtained when an error has occurred can be preserved.

However, according to a log management method discussed in Japanese Patent No. 5334739, the operation of the MFP is stopped when the size of the audit log file exceeds a predetermined threshold value in a fault state in which the audit log cannot be transmitted outside of the MFP. As a result, the user cannot use the MFP, which is inconvenient.

SUMMARY

Aspects of the present invention are generally directed to a system in which a user can use an apparatus and the log at that time can be continuously recorded while preserving a log obtained when an error has occurred and keeping an auditable state According to an aspect of the present invention, an information processing apparatus configured to record logs includes a log collection unit configured to collect logs recorded according to executed functions and store an audit log file including the collected logs in a storage unit, a detection unit configured to detect an error in the collection of logs, and a control unit configured to, when the error is detected, compress the audit log file stored in the storage unit and separately store the compressed audit log file in the storage unit while continuing to collect logs.

According aspects of the present invention, while preserving a log obtained when an error has occurred, and maintaining a auditable state, use of the apparatus by the user can be allowed and recoding of the log at that time can be continued.

Further features of the present disclosure will become apparent from the following description of an exemplary embodiment with reference to the attached drawings.

DESCRIPTION OF THE EMBODIMENTS

An exemplary embodiment will be described below with reference to the drawings. The following exemplary embodiment is not seen to be limiting, and all combinations of features described in the exemplary embodiment are not necessarily essential.

System Configuration

Figure 1:
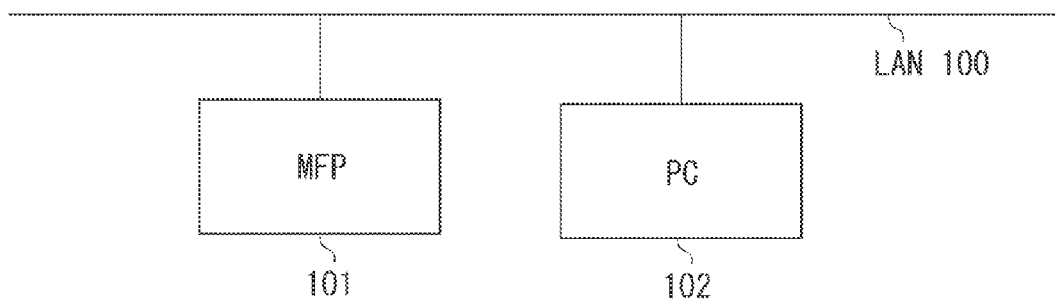
FIG. 1 is a block diagram illustrating a system configuration of an information processing apparatus according to an exemplary embodiment.

FIG. 1 illustrates an example of an entire configuration of a system to which an information processing apparatus according to a first exemplary embodiment is applicable.

Referring to FIG. 1, an image forming apparatus 101 is an information processing apparatus according to the present exemplary embodiment, and particularly corresponds to a multifunction peripheral (hereinafter referred to as an "MFP 101"). In the system illustrated in FIG. 1, the MFP 101 and a personal computer (PC) 102 are connected to a local area network (LAN) 100. The PC 102 is used to issue a print instruction to the MFP 101 and to control an operation of the MFP 101. The LAN 100 may be either a wired network or a wireless network. In addition, instead of using the LAN 100, another type of interface, such as a universal serial bus (USB), may be used to connect the MFP 101 and the PC 102.

The MFP 101 has a function of recording a log corresponding to the operation of the MFP 101 for the purpose of security audit such as traceability, audit, and prevention of information leakage.

Hardware Configuration

Figure 2:
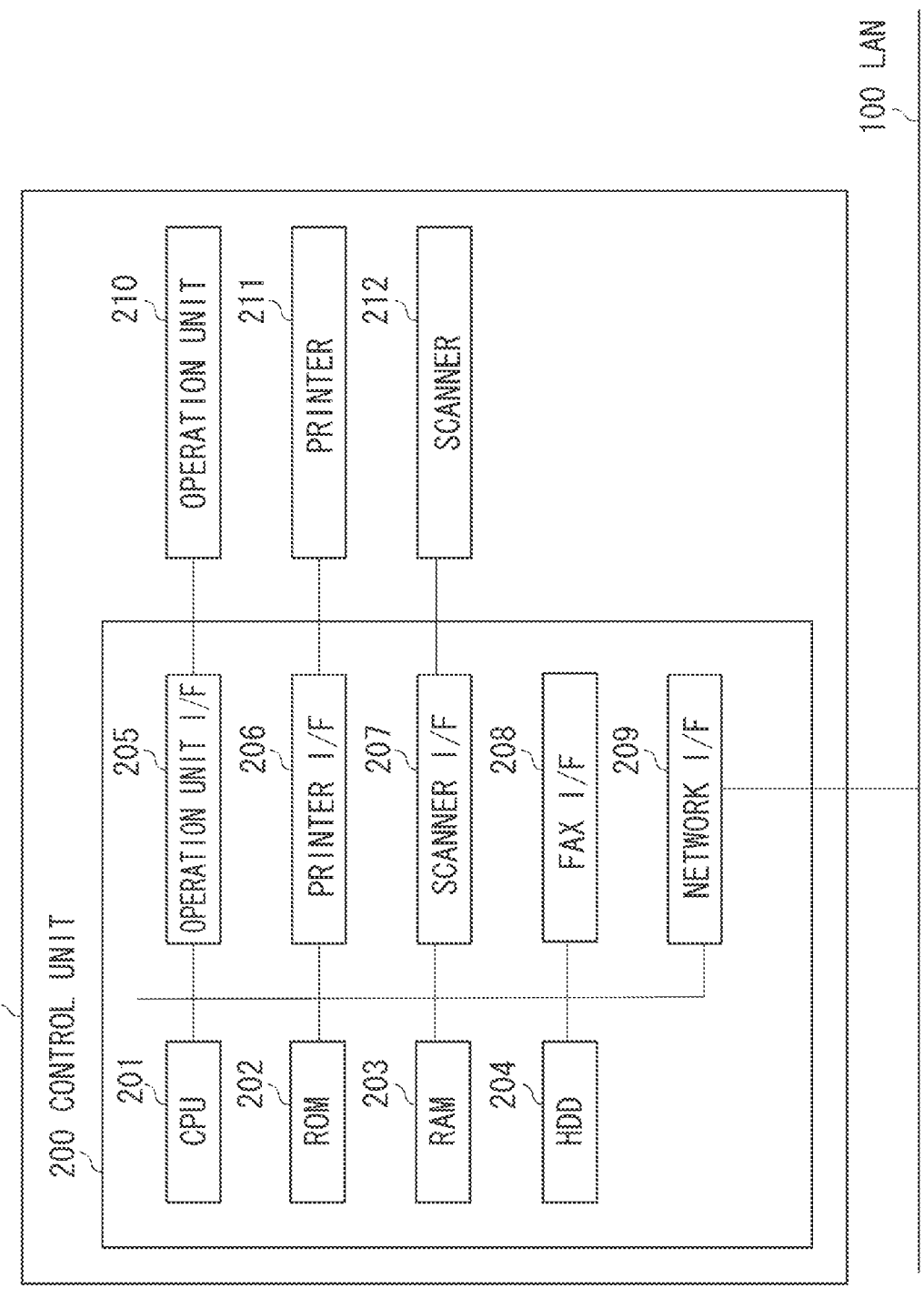
FIG. 2 is a block diagram illustrating a hardware configuration of an MFP.

FIG. 2 is a block diagram illustrating an example of a hardware configuration of the MFP 101.

A control unit 200 includes a central processing unit (CPU) 201, and controls an operation of the entire MFP 101. The CPU 201 reads control programs stored in a read-only memory (ROM) 202 to perform various controls such as a reading control and a transmission control. A random access memory (RAM) 203 is used as a temporary storage area of a main memory, a work area, and the like, for the CPU 201. A hard disk drive (HDD) 204 stores image data and various programs. Instead of the HDD 204, another type of storage device, such as a solid state drive (SSD), may be used.

An operation unit interface (I/F) 205 connects an operation unit 210 and the control unit 200.

A printer interface (I/F) 206 connects a printer 211 and the control unit 200. Image data to be printed by the printer 211 is transferred from the control unit 200 via the printer I/F 206, and is printed on a recording medium by the printer 211.

A scanner interface (I/F) 207 connects a scanner 212 and the control unit 200. The scanner 212 scans an image on a document to generate image data, and inputs the image data to the control unit 200 via the scanner I/F 207.

A facsimile interface (FAX I/F) 208 connects the control unit 200 to a telephone line (not illustrated). The FAX I/F 208 transmits and receives FAX data via the telephone line.

A network interface (I/F) 209 connects the control unit 200 (the MFP 101) to the LAN 100. The network I/F 209 receives a print instruction from an external apparatus (e.g., the PC 102), and transmits a response in response to the print instruction.

Software Configuration

Figure 3:
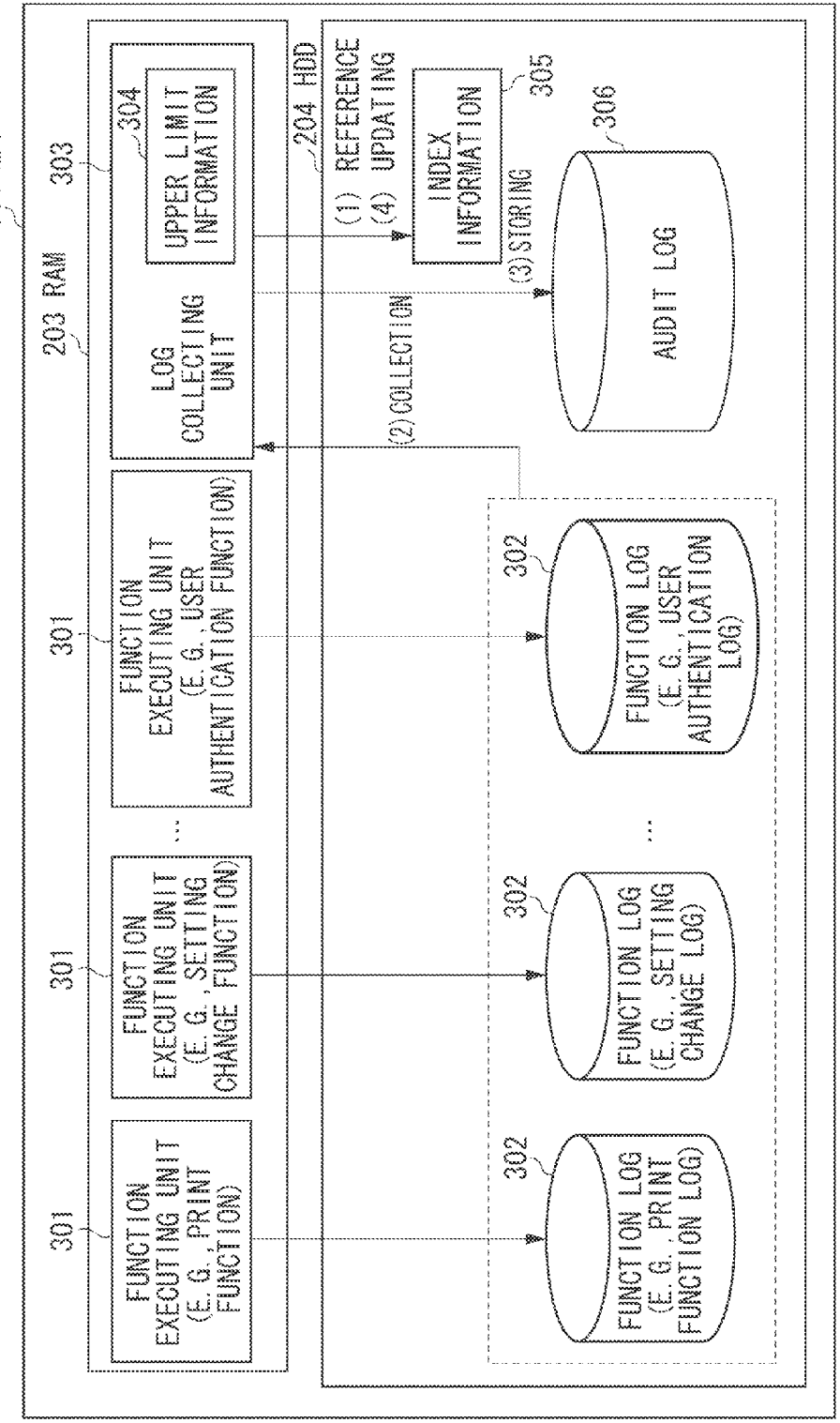
FIG. 3 is a block diagram illustrating a software configuration of the MFP.

FIG. 3 is a block diagram illustrating an example of a software configuration of the present exemplary embodiment in the MFP 101. Unless otherwise noted, the units illustrated in FIG. 3 are realized by the CPU 201 executing the control programs stored in the ROM 202.

As illustrated in FIG. 3, there is a plurality of function executing units 301. The function executing units 301 respectively control the printer I/F 206, the scanner I/F 207, and the FAX I/F 208 to execute a printing function, a scanning function, a FAX function, etc. Further, the function executing units 301 control the network I/F 209 to communicate with the PC 102, control a setting user interface (i.e., setting screen (not illustrated)) displayed on the operation unit 210 to change settings relating to the operation of the MFP 101, and further perform processing relating to user authentication.

When the function executing units 301 execute their functions, they store log data relating to the executed functions in corresponding function logs 302 in the HDD 204. Each function log 302 is present for each function executing unit 301. An example of the function log 302 is illustrated below.

The following Tables 1, 2, and 3 respectively illustrate examples of the function logs 302 for a print function, a setting change function, and a user authentication function.

TABLE 1

Print function log

| No. | Date and time | Use name | Result | Operation Type | Document name |
|---|---|---|---|---|---|
| 1 | May 1, 2014 09:01:10 | user1 | OK | Print | document1 |

TABLE 2

Setting change log

| No. | Date and time | Use name | Result | Operation Type | Set value |
|---|---|---|---|---|---|
| 1 | May 1, 2014 09:05.10 | admin | OK | Modify | user2 |

TABLE 3

User authentication log

| No. | Date and time | Use name | Result | Operation Type |
|---|---|---|---|---|
| 1 | May 1, 2014, 09:00:00 | user1 | OK | Login |
| 2 | May 1, 2014, 09:02:30 | user1 | OK | Logout |
| 3 | May 1, 2014, 09:05:00 | admin | OK | Login |
| 4 | May 1, 2014, 09:05:20 | admin | OK | Logout |

A log collecting unit 302 integrally collects the log data recorded in the function logs 302 at regular time intervals, and stores the log data as audit log 306 in the HDD 204. The collection of the function log data in the function logs 302 corresponds to the step "(2) COLLECTION" illustrated in FIG. 3, and the storing in the audit log 306 corresponds to the step "(3) STORING" illustrated in FIG. 3. Before and after the steps (2) and (3), the steps "(1) REFERENCE" and "(4) UPDATING" of index information 305 are performed. These steps will be described below.

The following Table 4 illustrates an example of the audit log 306. Note that Table 4 is a combination of the function logs 302 of Tables 1, 2, and 3.

TABLE 4

Audit log

| No. | Date and time | Log type | User name | Result | Operation type | Target |
|---|---|---|---|---|---|---|
| 1 | May 1, 2014, 09:00:00 | user authentication | user1 | OK | Login | |
| 2 | May 1, 2014, 09:01:10 | print | user1 | OK | Print | document1 |
| 3 | May 1, 2014, 09:02:30 | user authentication | user1 | OK | Logout | |
| 4 | May 1, 2014, 09:05:00 | user authentication | admin | OK | Login | |
| $$5 | May 1, 2014, 09:05:10 | setting change | admin | OK | Modify | user2 |
| 6 | May 1, 2014, 09:05:20 | user authentication | admin | OK | Logout | |

The reason that the logs are stored in two stages is as follows.

An MFP has a plurality of functions. In addition, MFP software is characteristically developed in such a manner that, in a process of version upgrade by reflecting the market demand, functions are increased step by step. Under such background, depending on the convenience of software design, it is not uncommon that logs are separately stored for each of functions. However, in a case where the logs remain separately stored, it is inconvenient for the user to handle the logs. In order to avoid such situation, the logs for the functions separately stored are integrated into one.

Subsequently, each unit will be described below.

In upper limit information 304, an upper limit of logs storable in the audit log 306 is recorded. In a case where, when the log collecting unit 303 stores log data in the audit log 306, the number of log data stored in the audit log 306 has reached the number of the upper limit information 304, for example, the oldest log data is deleted before new log data is added. As described above, the upper limit is controlled because a storage size of the HDD 204 has a limitation, so that the size of storage usable for log data is limited.

The index information 305 is a file in which to which number of the log data of the function log data the log collecting unit 303 has been acquired is recorded for each function. In other words, the index information 305 makes it possible to determine collected logs and uncollected logs for each function log. The log collecting unit 303 collects, from each function log 302, log data beginning at a number next to the number recorded in the index information 305, and stores the collected log data in the audit log 306. This control is performed in order to realize efficient log collection by acquiring only incremental log data.

Examples of the index information 305 are illustrated in the following Tables 5 and 6.

Table 5 illustrates the index information 305 in a state in which any function logs 302 have not been collected yet. In a case where log collection is performed in the state illustrated in Table 5, for each of all the functions, the log collecting unit 303 performs log collection from the first log data. In the index information 305 after log collection has been performed, as illustrated in Table 6, values in the column of "No. of acquired log data" are updated. In the column of "No. of acquired log data", a maximum number of acquired log data in the function logs 302 is written by function.

TABLE 5

State in which any log data have not been collected

| Log type | No. of acquired log data |
|---|---|
| print | 0 |
| setting change | 0 |
| user authentication | 0 |

TABLE 6

State after log data have been collected

| Log type | No. of acquired log data |
|---|---|
| Print | 1 |
| setting change | 1 |
| user authentication | 4 |

In a case where the index information 305 is corrupted, the log collecting unit 303 does not collect any log data in the function logs 302. This is because the log collecting unit 303 cannot know which number of log data to collect from the function logs 302. Accordingly, it may be said that the index information 305 is important in order to continue the log collection. Example cases in which the index information 305 is corrupted include a case where the power supply of the MFP 101 is lost due to a power failure while the index information 305 is being updated.

In order for the user of the MFP 101 to refer to the content of the audit log 306, there is a method in which each function executing unit 301 provides a management function for the audit log 306, whereby a log management screen is displayed on a Web browser (not illustrated) on the PC 102.

Figure 4:
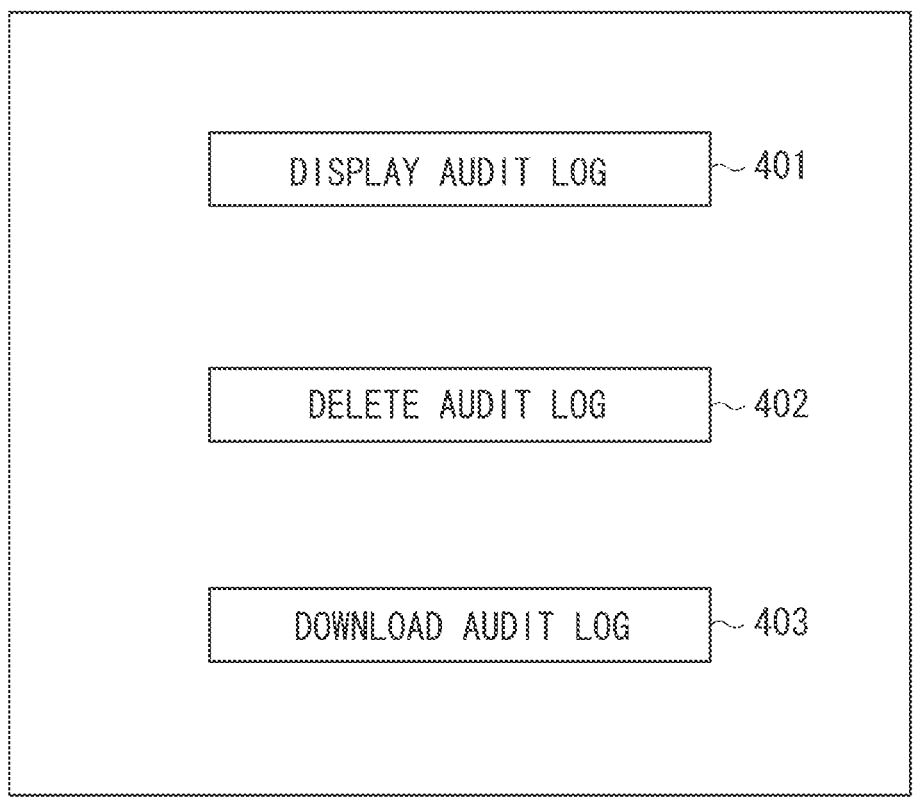
FIG. 4 is a diagram illustrating an example of a log management screen.

FIG. 4 illustrates an example of the log management screen.

In the example illustrated in FIG. 4, a press on a "DISPLAY MANAGEMENT LOG" button 401 causes the Web browser on the PC 102 to notify the MFP 101 of the display instruction. The function executing unit 301, which provides the audit log management function, displays the content of the audit log 306 on the Web browser. A press on a "DELETE AUDIT LOG" button 402 causes the Web browser on the PC 102 to notify the MFP 101 of the deletion instruction. The function executing unit 301, which provides the audit log management function, deletes all the log data stored in the audit log 306. A press on a "DOWNLOAD AUDIT LOG" button 403 causes the Web browser on the PC 102 to notify the MFP 101 of the download instruction. The function executing unit 301, which provides the audit log management function, transmits the content of the audit log 306 from the MFP 101 to the PC 102. The content of the audit log 306 is stored as a file in, for example, a storage device (such as an HDD) in the PC 102.

Log Collecting Process

A log collecting process by the log collecting unit 303 is described with reference to FIGS. 5 and 7.

Figure 5:
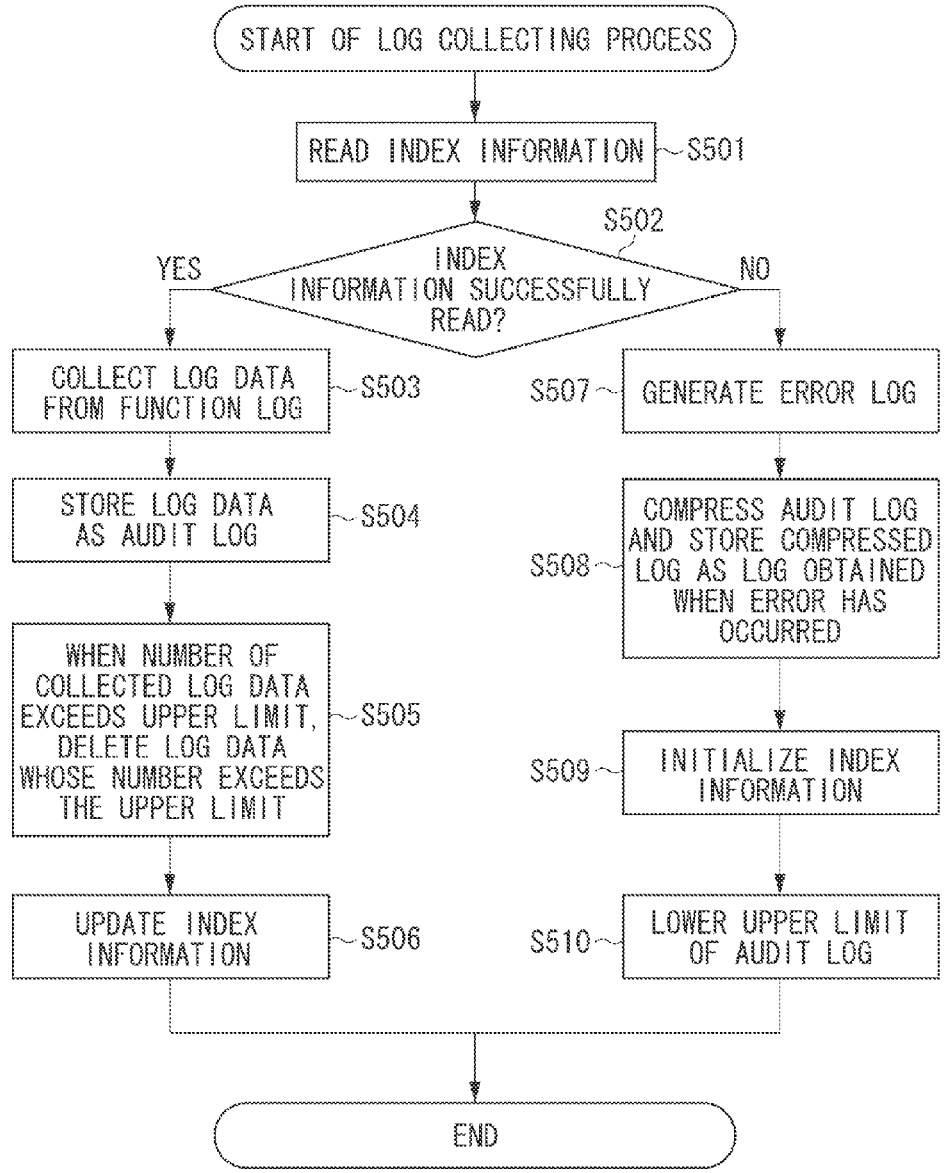
FIG. 5 is a flowchart illustrating a log collecting process.

FIG. 5 is a flowchart illustrating an example of the log collecting process by the log collecting unit 303. The log collecting process is executed at regular intervals (e.g., at intervals of 30 seconds). The log collecting process illustrated in the flowchart of FIG. 5 is realized by the CPU 201 of the MFP 101 reading and executing a program recorded in the PC 102 or the HDD 204.

Figure 7:
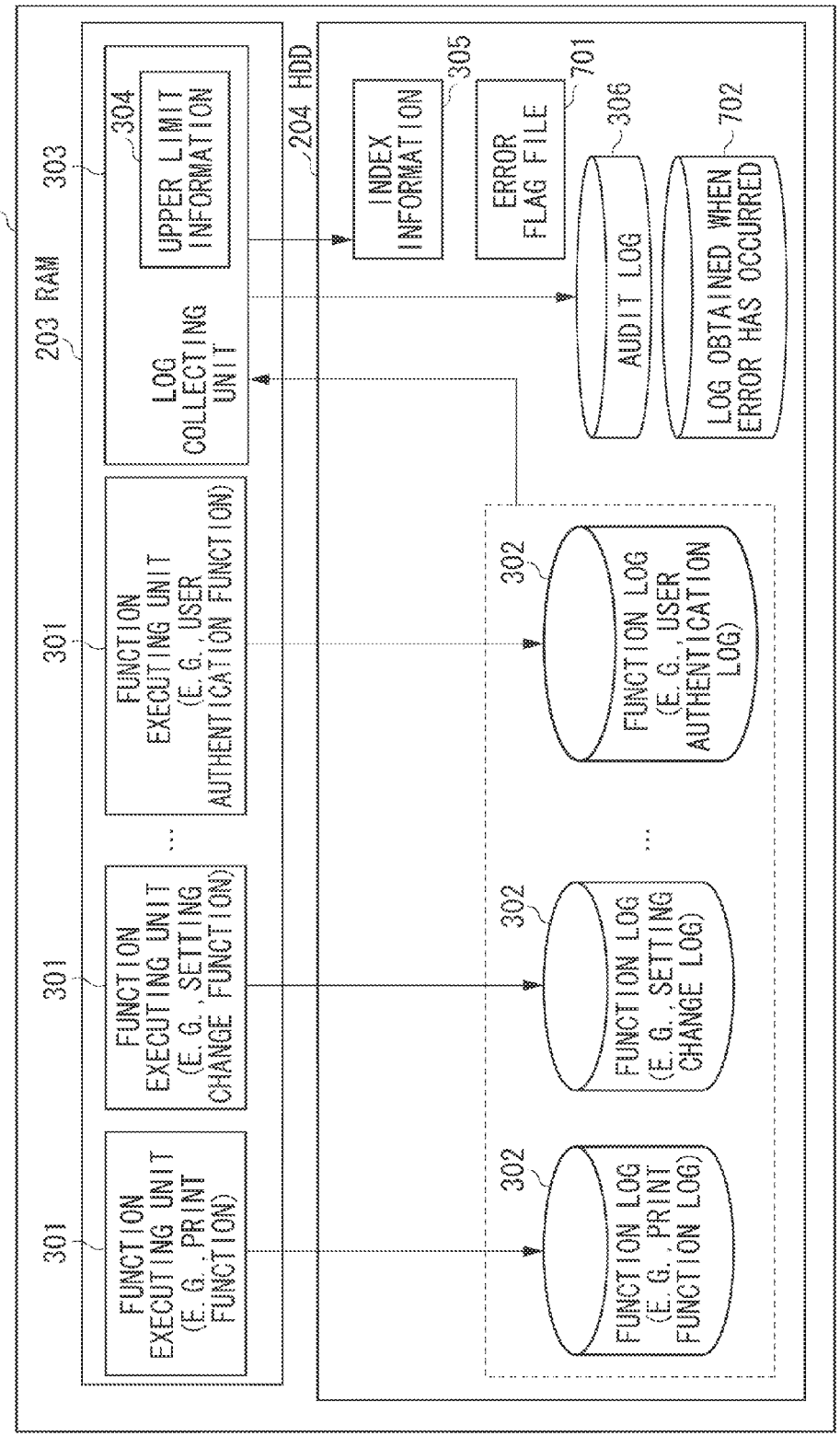
FIG. 7 is a block diagram illustrating a software configuration of an MFP when an error has occurred.

FIG. 7 is a block diagram illustrating an example of a software configuration of the MFP 101 when an error has occurred. FIG. 7 differs from FIG. 3 in that an error flag file 701 and a log 702 (both described below) obtained when an error has occurred are added to FIG. 7.

In step S501, the log collecting unit 303 reads the content of the index information 305. In step S502, depending on whether the log collecting unit 303 has successfully read the index information 305, the process branches off.

If it is determined that the log collecting unit 303 has successfully read the content of the index information 305, in steps S503 to S506, the log collecting unit 303 performs log collecting steps. More specifically, in step S503, the log collecting unit 303 collects log data from one function log 302, and in step S504, stores the log data as an audit log. In step S505, when the number of collected log data exceeds an upper limit, the log collecting unit 303 deletes log data whose number exceeds the upper limit. In step S506, the log collecting unit 303 updates the index information 305 before ending the log collecting process of the flowchart illustrated in FIG. 5.

Details of step S505 are described below.

The log collecting unit 303 compares the value of the upper limit information 304 (representing a maximum number of log data capable of being stored in the audit log 306) and the number of log data in the audit log 306. If the log collecting unit 303 has determined that the number of log data in the audit log 306 is greater, the log collecting unit 303 sequentially deletes, in the audit log 306, the log data whose number exceeds the value of the upper limit information 304 in chronological order of date and time.

Regarding deletion in the audit log 306, deletion of log data in chronological order of date and time has been described. Instead, log data may be deleted on the basis of priority set beforehand. For example, priority is set for each function, log data for functions which have lower priority may be deleted in chronological order of date and time, and log data for functions having higher priority may not be deleted. In addition, after deleting the log data in the audit log 306 so as not to exceed the upper limit in number, new log data may be stored in the audit log 306.

On the other hand, if it is determined that the log collecting unit 303 has not successfully read the index information 305 (NO in step S502), the log collecting unit 303 determines that an error interfering with the log collection has occurred, and then performs step S507 and thereafter. Their details are described below.

In step S507, if an error interfering with the log collection has occurred, the log collecting unit 303 generates the error flag file 701 in the HDD 204. The error flag file 701 is an empty file. The presence of this file indicates that an error has occurred.

In step S508, the log collecting unit 303 compresses the collected audit log 306, and separately stores, in the HDD 204, the compressed log as a log 702 obtained when an error has occurred, whereby the log obtained when an error has occurred is preserved. Different from the audit log 306, the log 702 obtained when an error has occurred is not deleted and is preserved until a user's confirmation operation or the like is detected.

In step S509, the log collecting unit 303 initializes the index information 305 to resolve the error interfering with the log collection.

More specifically, the log collecting unit 303 deletes the file of the index information 305 and creates a new file of the index information 305 in the HDD 204. The log collecting unit 303 writes a present maximum log number in the column of No. of acquired logs for each function. The present maximum log number can be acquired by the log collecting unit 303 inquiring of each function executing unit 301.

A case where the present maximum log number is written in the No. of acquired logs in the newly created index information 305 has been described. Instead, a value obtained by subtracting a predetermined number from the present maximum log number may be written. The predetermined number is preferably set to a value greater than the number of function logs that are supposed to be recorded between a previous log collection process and the present log collection process. The predetermined number may be a fixed value or may be determined by the log collecting unit 303 according to a log collection result in the past, or the like, by the log collecting unit 303. For example, for each function, by totaling collected log data in the past by the log collecting unit 303 on the day basis, on the time basis, or the like, the predetermined number may be determined on the day basis, on the time basis, or on the function basis based on the result of totaling. This technique can prevent occurrence of a failure in collecting function logs recorded between the previous log collection process and the present log collection process.

In step S509, the error interfering with the log collection is resolved by initializing the index information 305, the log collecting unit 303 advances the process to step S510.

In step S510, the log collecting unit 303 changes the value of the upper limit information 304 to a value smaller than that in normal state.

The log collecting unit 303 may reduce the value of the upper limit information 304 according to the size of the log 702 obtained when an error has occurred. In other words, the log collecting unit 303 controls the upper limit information 304 so that when the size of the log 702 obtained when an error has occurred is greater, a reduction amount in the value of the upper limit information 304 is set to be larger, while when the size of the log 702 obtained when an error has occurred is smaller, the reduction amount in the upper limit information 304 is set to be smaller. When the above-described step S510 ends, the log collecting unit 303 ends the log collecting process of the flowchart. The CPU 201 of the MFP 101 controls the MFP 101 to allow receiving a user's operation in the above-described state and to continue recording of a log for an executed function.

Through the processes performed in the above-described steps S507 to S510, subsequently, when the log collecting unit 303 performs the log collection process illustrated in FIG. 5, it is determined in step S502 that the index information 305 has successfully been read. Thus, the log collection process in the above-described step S503 and thereafter is executed.

In a case where the error interfering with the log collection has occurred, information on the occurrence of the error may be sent via an e-mail or the like to a manager's contact location registered beforehand.

As described above, in the MFP 101, even in a case where an error interfering with audit log collection has occurred, by preserving an audit log that remains at that time so as not to be lost caused by being overwritten with a subsequently recorded log, an audit state can be maintained. In addition, while the auditable state is maintained, use of the apparatus by the user is possible, and audit log recording can be continued.

Log Management Screen Display Process

The log management screen display process by the log collecting unit 303 is described below with reference to FIGS. 6 and 8.

Figure 6:
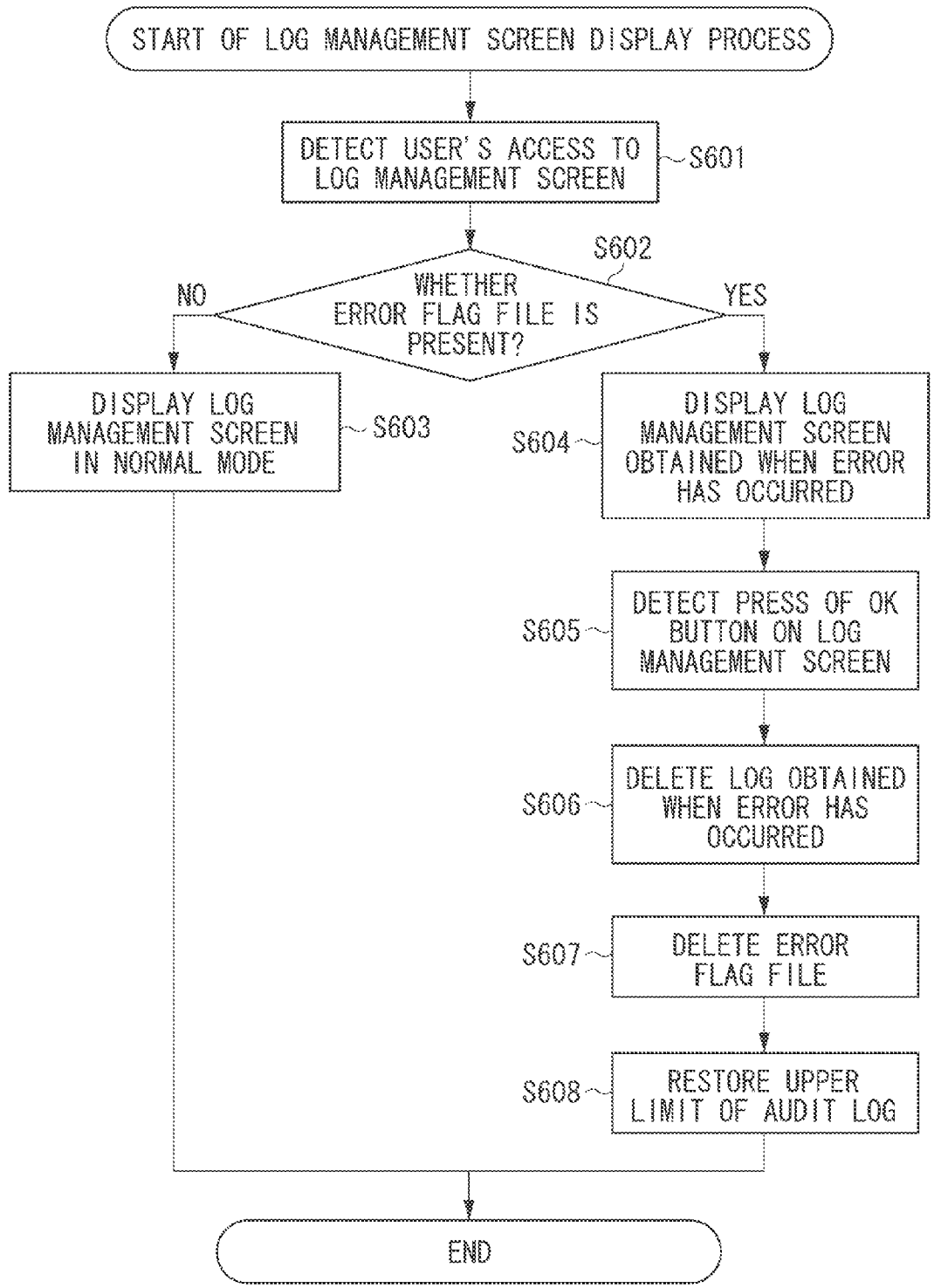
FIG. 6 is a flowchart illustrating an example of a log management screen display process.

FIG. 6 is a flowchart illustrating an example of a log management screen display process by the log collecting unit 303. The process according to the flowchart of FIG. 6 is realized by the CPU 201 of the MFP 101 reading and executing a program stored in the CPU 201 or the HDD 204.

In step S601, the log collecting unit 303 detects a user's access of a log management screen. For example, when a Web browser operating on the PC 102 accesses the MFP 101 for requesting a log management screen, the log collecting unit 303 detects the access and advances the process to step S602.

In step S602, the log collecting unit 303 determines whether the error flag file 701 is present. The result of the determination causes the process to branch off.

If it is determined that the error flag file 701 is not present (NO in step S602), in step S603, the log collecting unit 303 performs control to display a log management screen for a normal state. In a case of employing a system configuration that displays a log management screen on the Web browser, an actual process performed by the log collecting unit 303 is to transmit a Hypertext Markup Language (HTML) data for displaying the log management screen to the Web browser that operates on the PC 102. The Web browser that operates on the PC 102 displays the log management screen on a display of the PC 102 based on the HTML data. Thus, the log management screen is actually displayed by the Web browser, which has received the HTML data.

If it is determined that the error flag file 701 is present (YES in step S602), the log collecting unit 303 executes step S604 and thereafter. In step S604, the log collecting unit 303 performs control to display a log management screen displayed when an error has occurred. An actual process by the log collecting unit 303 is similar to the above-described process performed in step S603 in that the HTML data on the log management screen is only transmitted depending on the system configuration.

The log management screen displayed when an error has occurred is described below.

Figure 8:
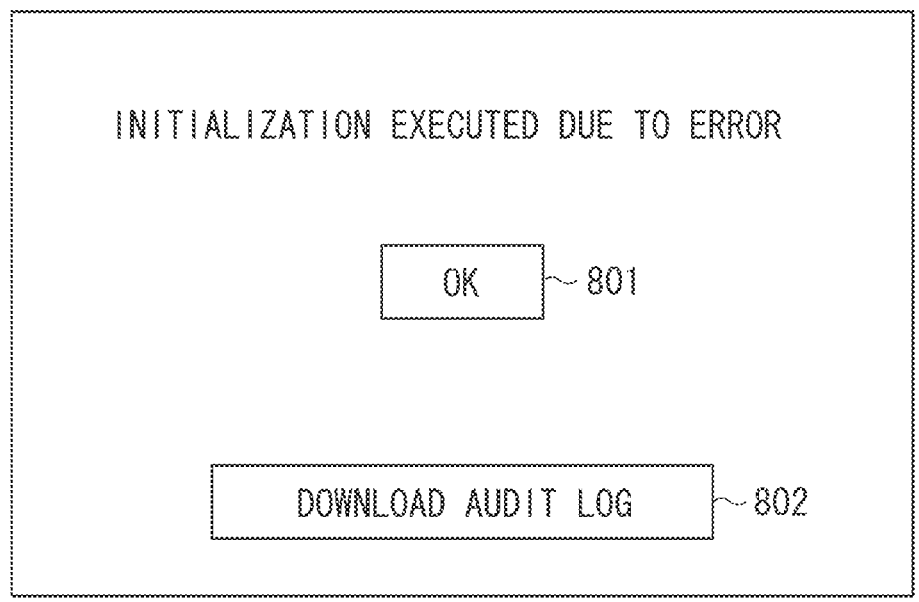
FIG. 8 is a diagram illustrating an example of a log management screen when an error has occurred.

FIG. 8 illustrates an example of a log management screen displayed when an error has occurred.

As illustrated in FIG. 8, the log management screen displayed when an error has occurred has thereon an "OK" button 801, and a "DOWNLOAD AUDIT LOG" button 802, which can be pressed by the user. For example, a press on the "DOWNLOAD AUDIT LOG" button 802 causes the Web browser on the PC 102 to notify the MFP 101 of the instruction. Then, the log collecting unit 303 or the like transmits, to the PC 102, the log 702 obtained when an error has occurred, stored in step S508 in FIG. 5. The PC 102 stores, in a storage device (e.g., an HDD or the like in the PC 102), the log 702 obtained when an error has occurred, which is received from the MFP 101.

By displaying the log management screens illustrated in FIGS. 8 and 4 on the operation unit 210, the user may perform a confirmation operation relating to occurrence of an error via the operation unit 210. In this case, downloading of an audit log is executed by designating a predetermined folder or the like in the PC 102 via the operation unit 210.

In step S605, the log collecting unit 303 detects a press on the OK button 801 on the log management screen displayed when an error has occurred. For example, when receiving a press on the OK button 801 from the Web browser of the PC 102, the log collecting unit 303 determines that a user's confirmation operation relating to occurrence of the error has been detected, and executes step S606 and thereafter.

More specifically, in step S606, the log collecting unit 303 deletes the log 702 obtained when an error has occurred. In step S607, the log collecting unit 303 deletes the error flag file 701. Finally, in step S608, the log collecting unit 303 restores the value of the upper limit information 304 to an original value (value of the normal state). Accordingly, thereafter, the user has accessed the log management screen, it is determined in step S602 that the error flag file 701 is not present. Thus, in step S603, the log management screen of the normal state is displayed.

In the present exemplary embodiment, an example has been described where, in response to detection of the press on the OK button 801, the log 702 obtained when an error has occurred is deleted and the upper limit information 304 is restored. However, the condition for restoring the upper limit information 304 to the original value is not limited thereto. For example, in a case where the log 702 obtained when an error has occurred has been downloaded (transmitted outside), the log 702 obtained when an error has occurred may be deleted. On condition that, the upper limit information 304 may be restored to the original value.

In step S608, the case where the upper limit information 304 is restored to the original value has been described. Instead thereof, according to the remaining capacity of the HDD 204 or the like, the value of the upper limit information 304 may be increased. For example, when the remaining capacity of the HDD 204 is greater than a predetermined storage capacity, the log collecting unit 303 may restore the value of the upper limit information 304 to the original value. When the remaining capacity of the HDD 204 is smaller than the predetermined storage size, the value of the upper limit information 304 may be increased to a particular value ("present value"<"particular value"<"original value").

In a case where a plurality of logs 702 obtained when errors have occurred have been created, such as when an error has occurred again before the log 702 obtained when an error has occurred is deleted, by performing a user's confirmation operation once, all the logs 702 obtained when errors have occurred may be deleted to increase the value of the upper limit information 304. Further, for each of logs 702 obtained when errors have occurred, the log 702 obtained when an error has occurred may be deleted, and the value of the upper limit information 304 may be increased by a value corresponding to the size of the deleted log 702 obtained when an error has occurred.

Through the above-described process, even if an error relating to log collection has occurred, at a time when the error has occurred, by evacuating, in the MFP 101, the audit log 306 at that time as a log 702 obtained when an error has occurred, an audit log when the error has occurred can be preserved. When the audit log is evacuated, the audit log is not simply evacuated but is compressed before being evacuated. Further, an upper limit of the number of logs to be newly recorded is decreased. By enabling reception of a user's operation in this state, and recording logs for executed functions, it is possible to both preserve the log when an error has occurred and continue recording of use of the MFP by the user and logs.

Therefore, when an error that interferes with log collection by the log collecting unit 303 has occurred, while a log obtained when an error has occurred is maintained and an auditable state is maintained, use of the MFP 101 by the user is caused possible, and recording of the audit log at that time can be continued.

In the above-described exemplary embodiment, a configuration has been described in which when an error that interferes with log collection by the log collecting unit 303 has occurred, an audit log obtained when the error has occurred is preserved. However, a timing of preserving the audit log is not limited to a time when the error that interferes with log collection has occurred. Even if other types of errors have occurred, by performing a similar process, while an audit log obtained when the error has occurred is preserved and an auditable state is maintained, use of the MFP 101 is enabled and recording of the audit log at that time can be continued. In the case of such configuration, it is supposed that when any error has occurred, the log collecting unit 303 executes processing in steps S507 to S510, without limiting the processing to the log collecting process illustrated in FIG. 5.

Further, aspects of the present invention are not limited to the MFP 101 and are applicable to other information processing apparatuses such as computers and various types of information processing devices.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting.

This application claims the benefit of Japanese Patent Application No. 2014-162625, filed Aug. 8, 2014, which is hereby incorporated by reference herein in its entirety.

What is claimed is:

1. An information processing apparatus configured to record logs, the information processing apparatus comprising:
    a log collection unit configured to collect logs recorded according to executed functions and store an audit log file including the collected logs in a storage unit;
    a detection unit configured to detect an error in the collection of logs;
    a control unit configured to, when the error is detected, compress the audit log file stored in the storage unit and separately store the compressed audit log file in the storage unit while continuing to collect logs; and
    a deletion unit configured to, when a number of audit log files stored in the storage unit exceeds an upper limit, delete audit log files,
    wherein the control unit reduces the upper limit when the error is detected.

2. The information processing apparatus according to claim 1, wherein the control unit deletes, when a confirmation operation relating to an occurrence of the error is detected the separately stored audit log file to increase the upper limit.

3. The information processing apparatus according to claim 1, wherein the control unit reduces the upper limit according to a size of the compressed audit log file.

4. The information processing apparatus according to claim 1, wherein the deletion unit sequentially deletes the stored audit log file in chronological date order.

5. The information processing apparatus according to claim 1, wherein the deletion unit deletes the stored audit log file based on priority.

6. The information processing apparatus according to claim 1, further comprising a transmission unit configured to transmit the separately stored audit log file in response to a request.

7. The information processing apparatus according to claim 6, wherein the control unit deletes, in a case where the transmission unit has transmitted the separately stored audit log file, the separately stored audit log file to increase the upper limit.

8. The information processing apparatus according to claim 1, wherein the error is an error that interferes with the collection of the logs by the log collection unit.

9. The information processing apparatus according to claim 8,
    wherein the storage unit records index information to identify uncollected logs and collects uncollected logs based on the index information, and
    wherein the error is an error in reading the index information.

10. The information processing apparatus according to claim 9, wherein the index information is information in which the index information is recorded separately for each of the executed functions.

11. The information processing apparatus according to claim 9, wherein the control unit creates new index information to continue the collection of logs by the log collection unit.

12. The information processing apparatus according to claim 1, wherein the information processing apparatus is an image forming apparatus.

13. A control method for an information processing apparatus configured to record logs, the control method comprising:
    collecting logs recorded according to executed functions;
    storing an audit log file including the collected logs;
    detecting an error in the collection of logs;
    compressing, when the error is detected, the stored audit log file;
    separately storing the compressed log file while continuing to collect logs;
    deleting audit log files when a number of audit log files stored exceeds an upper limit; and
    controlling the upper limit when the error is detected.

14. A non-transitory computer-readable storage medium storing a program for causing a computer to execute a control method for an information processing apparatus configured to record logs, the control method comprising:
    collecting logs recorded according to executed functions;
    storing an audit log file including the collected logs;
    detecting an error in the collection of logs;
    compressing, when the error is detected, the stored audit log file;
    separately storing the compressed log file while continuing to collect logs;
    deleting audit log files when a number of audit log files stored exceeds an upper limit; and
    controlling the upper limit when the error is detected.

* * * * *